June 4, 1957  G. M. FINKES  2,794,312
BROOM TYPE LAWN RAKE
Filed Nov. 14, 1955
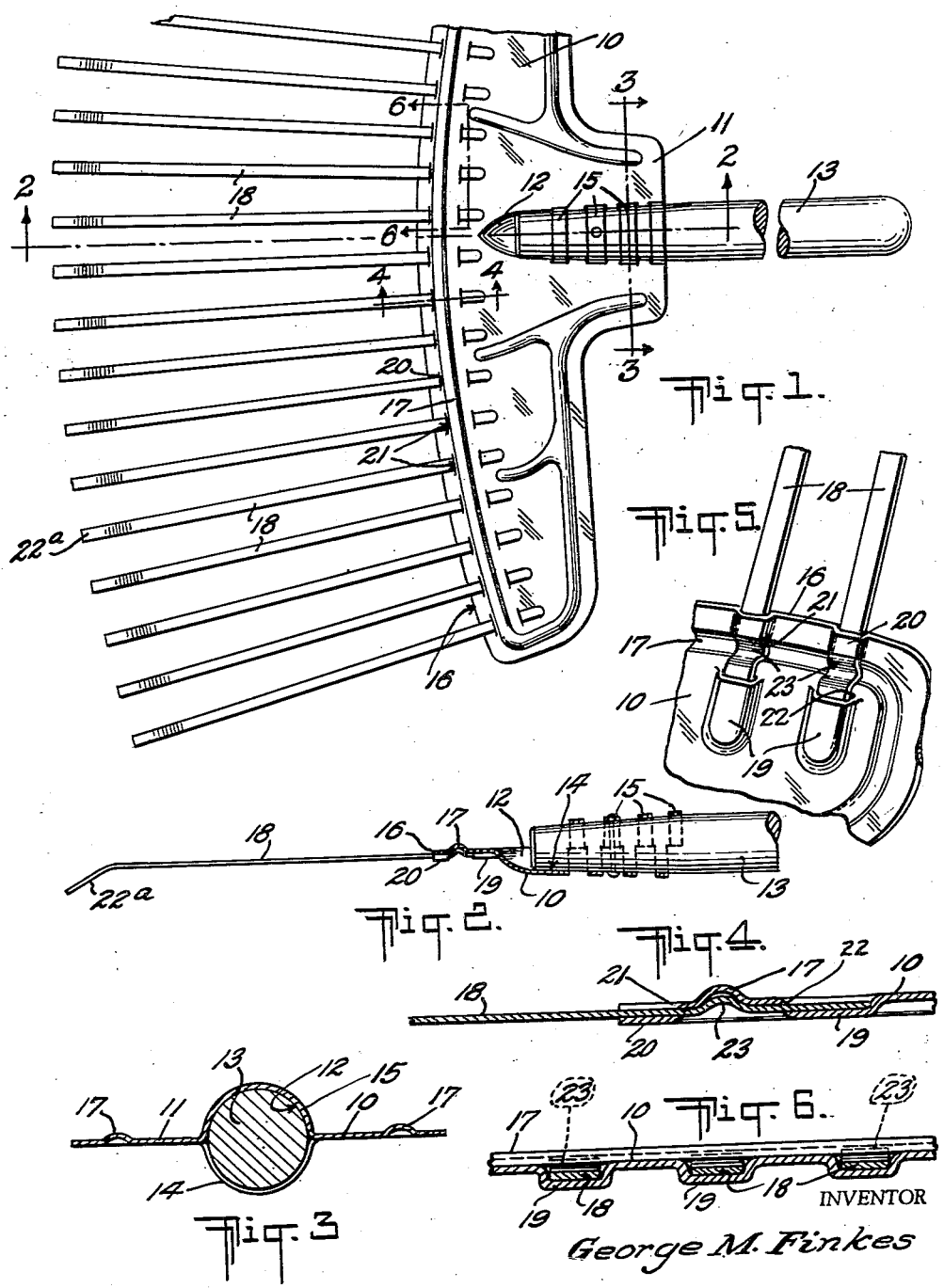
INVENTOR
George M. Finkes
BY W. S. Rambo
ATTORNEY United States Patent Office 2,794,312
Patented June 4, 1957

2,794,312

BROOM TYPE LAWN RAKE

George M. Finkes, Columbus, Ohio, assignor to The Union Fork and Hoe Company, Columbus, Ohio, a corporation of Ohio Application November 14, 1955, Serial No. 546,476

1 Claim. (Cl. 56—400.17)

This invention relates to improvements in lawn-sweeping rakes or brooms, especially rakes or brooms of the manually operated type having a handle-equipped mounting plate carrying a plurality of outwardly and radially extending, resiliently flexible, teeth or tines and utilized in various capacities, such as raking or sweeping leaves, twigs and other debris from grass lawns, or other surfaces.

Among others, certain of the objects of the invention are: to provide a lawn rake having a mounting plate formed with improved means for the individual reception and retention of the inner ends of a plurality of tines in joined associated therewith; to provide a lawn rake in which the tines are united mechanically with the mounting plate in a firm and secure manner and without the employment of welding operations; to provide a rake having a mounting plate provided with spaced inner and outer rows of tine-receiving sockets formed with slotted ends for the longitudinal insertion of the inner ends of a plurality of spaced, resiliently flexible tines therein, there being a socket in said head for individually receiving each of said tines, the walls of each socket being so formed as to retain a tine positioned therein secure against movement relative to the receiving socket in all directions except that of longitudinal withdrawal of the tine from the socket and from its operative mounted position on the head; to provide improved means for precluding normally such outward withdrawal of the tines from the receiving sockets provided therefor in the mounting plate, wherein said means includes a hollow stiffening ridge pressed in the outer edge portion of the mounting plate between the inner and outer rows of tine-receiving sockets therein, the portions of each of the tines in registry with the ridge having imparted thereto a yieldable hump-like locking formation which is receivable within the ridge of the mounting plate to hold positively each tine in its operative position and to restrain the same against accidental withdrawal; to provide the mounting plate of such a lawn rake with integral, oppositely bowed, longitudinally spaced webs which provide jointly a socket for the reception of the adjacent end of an elongated manipulating handle, the web eliminating the need for employing the separate handle-clamping plates of prior rakes; and to provide a lawn rake which comprises generally an improvement over prior rakes of this type.

For a further understanding of the invention, reference may be had to the following description and the accompanying drawing, wherein:

Fig. 1 is a fragmentary elevational view of a lawn rake formed in accordance with the features of the present invention;

Fig. 2 is a vertical longitudinal sectional view taken through the rake on the plane indicated by the line 2—2 of Fig. 1;

Fig. 3 is a transverse sectional view taken through the handle-attaching means of the mounting plate of my improved rake on the line 3—3 of Fig. 1;

Fig. 4 is a an enlarged longitudinal sectional view taken through the tine-receiving socket construction of the mounting plate on substantially the plane indicated by the line 4—4 of Fig. 1;

Fig. 5 is an enlarged fragmentary perspective view looking toward the back of the mounting plate of the rake and disclosing the tines and the socket construction therefor provided in the plate;

Fig. 6 is an enlarged transverse sectional view on the line 6—6 of Fig. 1.

As illustrated in the drawing, the rake comprises a sheet metal supporting or mounting plate 10. The plate is formed in this instance to include an enlarged handle-carrying central region 11 in which an upwardly or rearwardly extending handle socket 12 is provided for the reception of the tapered lower end of an elongated handle member 13. In the formation of this handle socket, the region 11 provides a rearwardly projecting, semi-circular pocket 14. The material comprising this pocket includes a plurality of relatively spaced and forwardly or upwardly projecting semi-circular straps or webs 15, the webs 15 tapering to conform to the pocket 14 and taper of the lower end of the handle member 13. With the handle socket so designed, the same possesses the advantage that all parts thereof are formed integrally with the mounting plate, avoiding the use of separable clamping members.

The forward or lower edge 16 of the mounting plate 10, when the rake is considered as being positioned or held in a normal upright manner, is of convex, arcuate formation, as shown in Fig. 1. Also, the plate is formed with a hollow stiffening ridge or rib 17 which extends in close proximity to the edge 16 and, also, if desired, other marginal edges of the plate 10 to reinforce and rigidify the plate body.

In order to unite mechanically the straight upper ends of a plurality of relatively spaced, radially extending, resiliently flexible tines 18 with the mounting plate, the latter is formed with inner and outer rows 19 and 20, respectively, of tine-seating depressions, said rows being disposed on opposite sides of the length of the ridge 17 disposed in adjacent concentric relation with the arcuate edge 16. The upper ends of the lower or outer row of depressions 20 are each slotted at 21 and the lower ends of the upper or inner row of seating depressions 19 are slotted at 22 to receive the straight upper ends of the tines 18. The outer or lower ends of the tines may be angularly deflected at 22a.

When operatively positioned in these seating depressions, the tines have their upper ends disposed in positive engagement with the wall surfaces of said depressions so that the tines are securely held against movement in any direction relative thereto, except in a longitudinal downward direction. To hold normally the tines against such downward or outward movement, the tines are formed adjacent their upper ends with forwardly projecting hump convex locking formations 23. These formations are adapted to be positioned in the interior of the ridge 17 and to engage the wall surfaces thereof with sufficient firmness to prevent the tines from becoming accidentally released or removed from their normally secured relationship with the mounting plate. In the event of tine breakage or other structural impairment, the mounting makes possible the convenient necessary part replacement.

In view of the foregoing, it will be seen that the present invention provides a lawn rake or the like wherein the tines are mechanically united in a secure and effective manner with an associated mounting plate. The construction avoids the prior practice of spot welding the tines to the plate or of perforating the plate-engaged ends of the tines to enable the same to receive lugs or bosses struck from the plate. In the present construction not only does the convex ridge 17 stiffen the plate but it, also, serves as a means for positively but removably retaining the tines in their operative positions.

I claim:

In a lawn rake; a rake head comprising an integral, one-piece, substantially flat metallic plate having a plurality of alternately vertically offset handle-receiving straps formed in the central inner edge portion thereof and an arcuate forward edge portion formed with a multiplicity of separate relatively spaced, outwardly opening depressions disposed in vertically offset relation to the plane of the main body portion of said plate, the depressions formed in the forward edge portion of said plate being slotted at the inner ends thereof and defining adjacent the forward edge of said plate a first row of tine-receiving and locating sockets; a second set of relatively spaced depressions formed in said plate in inwardly spaced radial alignment with said first-named depressions, said second set of depressions being vertically offset from the plane of the main body portion of said plate and being slotted at their outer ends and closed at their inner ends to define a second row of tine-receiving and locating sockets; a continuous, arcuate, reinforcing and tine-locking groove formed in said plate between said first and second rows of sockets, said groove being vertically offset from the plane of the main body portion of said plate in a direction opposite the depressions defining said sockets; and a plurality of radially outwardly projecting, substantially flat rectangular tines formed with inner shank ends occupying said rows of sockets, the inner shank ends of said tines between said rows of sockets being bent vertically inwardly of and conforming substantially to said groove to lock said tines to said plate against accidental outward withdrawal therefrom.

References Cited in the file of this patent

UNITED STATES PATENTS

| | | |
|---|---|---|
| 2,252,114 | Brown | Aug. 12, 1941 |
| 2,746,235 | Kautenberg | May 22, 1956 |